United States Patent
Matsui et al.

(10) Patent No.: US 9,419,499 B2
(45) Date of Patent: Aug. 16, 2016

(54) ROTATING ELECTRIC MACHINE HAVING A COOLING DEVICE AND COOLING LIQUID COLLECTION TANKS

(71) Applicant: DENSO CORPORATION, Kariya, Aichi-pref. (JP)

(72) Inventors: Hirohito Matsui, Okazaki (JP); Koji Asagara, Nishio (JP); Atsuo Ishizuka, Nagoya (JP)

(73) Assignee: DENSO CORPORATION, Kariya (JP)

( * ) Notice: Subject to any disclaimer, the term of this patent is extended or adjusted under 35 U.S.C. 154(b) by 22 days.

(21) Appl. No.: 14/284,589

(22) Filed: May 22, 2014

(65) Prior Publication Data
US 2014/0346905 A1    Nov. 27, 2014

(30) Foreign Application Priority Data

May 22, 2013 (JP) ................................. 2013-108347

(51) Int. Cl.
| | | |
|---|---|---|
| *H02K 9/19* | (2006.01) | |
| *H02K 9/193* | (2006.01) | |
| *H02K 3/24* | (2006.01) | |
| *H02K 9/22* | (2006.01) | |
| *H02K 9/197* | (2006.01) | |
| *H02K 5/20* | (2006.01) | |

(52) U.S. Cl.
CPC .. *H02K 9/19* (2013.01); *H02K 3/24* (2013.01); *H02K 5/20* (2013.01); *H02K 9/193* (2013.01); *H02K 9/197* (2013.01); *H02K 9/22* (2013.01)

(58) Field of Classification Search
CPC ............. H02K 9/19; H02K 3/24; H02K 5/20; H02K 9/193; H02K 9/197; H02K 15/12

USPC .......................... 310/52, 53, 54, 64, 58, 63, 65
See application file for complete search history.

(56) References Cited

U.S. PATENT DOCUMENTS

| | | | | |
|---|---|---|---|---|
| 4,443,723 A  * | 4/1984 | Ohkubo | ........................ | 310/53 |
| 6,515,384 B1 * | 2/2003 | Kikuchi | ............... | H02K 9/197 |
| | | | | 310/54 |
| 6,617,716 B2 * | 9/2003 | Ishida | .................. | H02K 1/185 |
| | | | | 310/54 |
| 7,211,913 B2 * | 5/2007 | Tsutsui | ................... | B60K 6/48 |
| | | | | 310/52 |
| 7,414,338 B2 * | 8/2008 | Endo | .................. | F04B 39/0253 |
| | | | | 310/52 |
| 8,269,383 B2 * | 9/2012 | Bradfield | ....................... | 310/58 |

(Continued)

FOREIGN PATENT DOCUMENTS

| | | |
|---|---|---|
| JP | 2006-115651 | 4/2006 |
| JP | 2006-311750 | 11/2006 |
| WO | WO 2011153533 A2 * | 12/2011 |

*Primary Examiner* — Terrance Kenerly
*Assistant Examiner* — Rashad Johnson
(74) *Attorney, Agent, or Firm* — Nixon & Vanderhye P.C.

(57) ABSTRACT

A rotating electric machine includes a rotor, a stator, a cooling device and a pair of cooling liquid collection tanks. The stator includes an annular stator core and a stator coil. The stator core is disposed radially outside the rotor so as to surround the rotor. The stator coil is mounted on the stator core so that a pair of coil ends of the stator coil protrude axially outward respectively from opposite axial end faces of the stator core. The cooling device is configured to supply cooling liquid to vertically upper parts of the coil ends of the stator coil. Each of the cooling liquid collection tanks is arranged to surround a vertically lower part of a corresponding one of the coil ends so as to collect and temporarily reserve therein the cooling liquid moved from the upper part to the lower part of the corresponding coil end.

5 Claims, 8 Drawing Sheets

(56) References Cited

U.S. PATENT DOCUMENTS

| | | | | |
|---|---|---|---|---|
| 2005/0151429 A1* | 7/2005 | Taketsuna | H02K 9/197 | 310/54 |
| 2007/0278869 A1* | 12/2007 | Taketsuna | H02K 9/19 | 310/54 |
| 2009/0121562 A1* | 5/2009 | Yim | H02K 9/19 | 310/54 |
| 2010/0038981 A1* | 2/2010 | Urano | H02K 9/22 | 310/54 |
| 2011/0140551 A1* | 6/2011 | Adaniya et al. | | 310/64 |
| 2011/0156508 A1* | 6/2011 | Minemura et al. | | 310/54 |
| 2012/0126642 A1* | 5/2012 | Miyamoto | H02K 9/197 | 310/54 |
| 2013/0270931 A1* | 10/2013 | Handa | H02K 1/32 | 310/43 |

* cited by examiner

ROTATING ELECTRIC MACHINE HAVING A COOLING DEVICE AND COOLING LIQUID COLLECTION TANKS

CROSS-REFERENCE TO RELATED APPLICATION

This application is based on and claims priority from Japanese Patent Application No. 2013-108347, filed on May 22, 2013, the content of which is hereby incorporated by reference in its entirety into this application.

BACKGROUND

1. Technical Field

The present invention relates to rotating electric machines that are used in, for example, motor vehicles as electric motors and electric generators.

2. Description of Related Art

Figure 13:
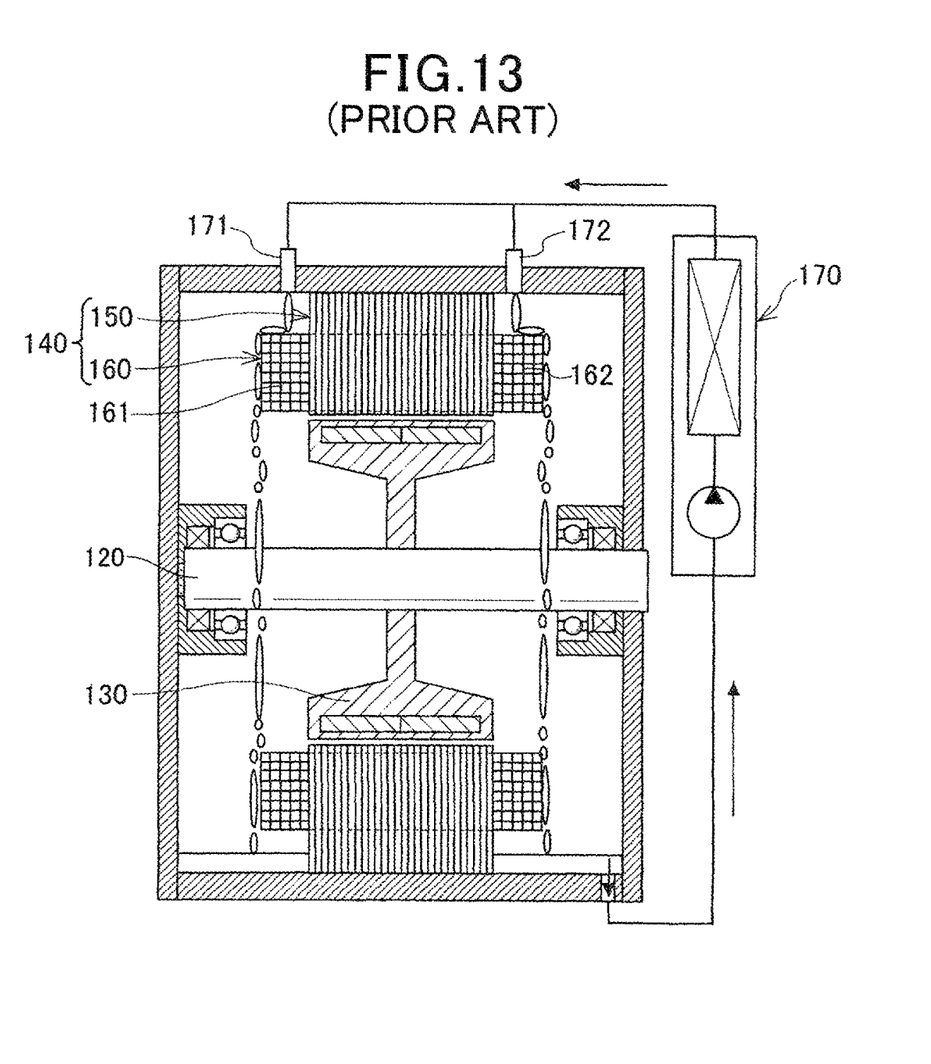
FIG. 13 is a schematic cross-sectional view of a conventional rotating electric machine taken in a plane including the axis of a rotating shaft of the machine.

FIG. 13 shows the overall configuration of a conventional rotating electric machine for a vehicle. As shown in the figure, the conventional rotating electric machine includes a rotating shaft 120, a rotor 130, a stator 140 and a cooling device 170. The rotating shaft 120 is rotatably supported by a housing of the machine via bearings. The rotor 130 is fixed on the rotating shaft 120 so as to rotate with the rotating shaft 120. The stator 140 includes an annular stator core 150 that is disposed radially outside the rotor 130 so as to surround the rotor 130, and a stator coil 160 that is mounted on the stator core 150 so as to have a pair of coil ends 161 and 162 protruding axially outward respectively from opposite axial end faces of the stator core 150. The cooling device 170 is provided to supply cooling liquid to vertically upper parts of the coil ends 161 and 162 of the stator coil 160.

During operation of the machine, electric current flows in the stator coil 160, thereby generating heat. Therefore, it is necessary to cool the stator coil 160.

To this end, the cooling device 170 is configured, for example as disclosed in Japanese Unexamined Patent Application Publication No. 2006-115651, to have a pair of cooling pipes 171 and 172 respectively located vertically upward of the coil ends 161 and 162 of the stator coil 160. Consequently, it is possible to supply the cooling liquid to the vertically upper parts of the coil ends 161 and 162 via the cooling pipes 171 and 172.

However, with the above configuration, it may be difficult to sufficiently cool vertically lower parts of the coil ends 161 and 162 of the stator coil 160.

Figure 14:
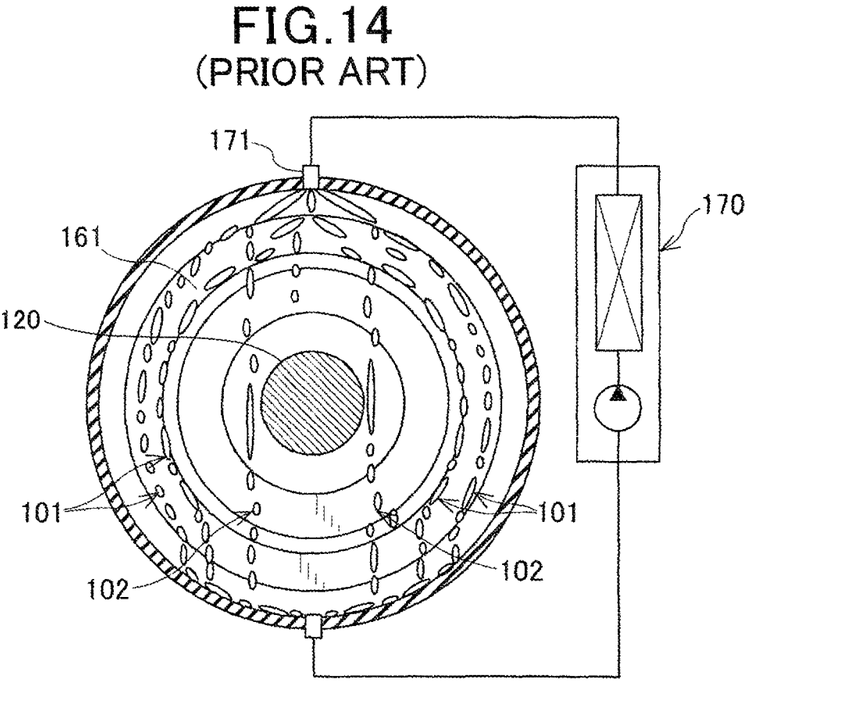
FIG. 14 is a schematic cross-sectional view of the conventional rotating electric machine taken in a plane perpendicular to the axis of the rotating shaft.

More specifically, with the above configuration, the cooling liquid may flow from the upper parts to the lower parts of the coil ends 161 and 162 by gravity along the surfaces of the coil ends 161 and 162, i.e., flow along first flow paths 101 as shown in FIG. 14. In this case, the temperature of the cooling liquid will be increased by heat conducted from the coil ends 161 and 162 to the cooling liquid during the flow of the cooling liquid along the first flow paths 101. Consequently, with the cooling liquid whose temperature has been increased, it may be difficult to sufficiently cool the lower parts of the coil ends 161 and 162.

On the other hand, depending on the positions of the cooling pipes 171 and 172, the flow rate of the cooling liquid and the shapes of the coil ends 161 and 162, the cooling liquid may directly fall down through gaps or void spaces formed in the coil ends 161 and 162, i.e., flow directly downward along second flow paths 102 as shown in FIG. 14. In this case, it may be difficult to supply a sufficient amount of the cooling liquid to the lower parts of the coil ends 161 and 162. Consequently, it also may be difficult to sufficiently cool the lower parts of the coil ends 161 and 162.

SUMMARY

According to an exemplary embodiment, a rotating electric machine is provided which includes a rotor, a stator, a cooling device and a pair of cooling liquid collection tanks. The stator includes an annular stator core and a stator coil. The stator core is disposed radially outside the rotor so as to surround the rotor. The stator coil is mounted on the stator core so that a pair of coil ends of the stator coil protrude axially outward respectively from opposite axial end faces of the stator core. The cooling device is configured to supply cooling liquid to vertically upper parts of the coil ends of the stator coil. Each of the cooling liquid collection tanks is arranged to surround a vertically lower part of a corresponding one of the coil ends of the stator coil so as to collect and temporarily reserve therein the cooling liquid moved from the upper part to the lower part of the corresponding coil end.

With the above configuration, the lower parts of the coil ends of the stator coil can be kept in a state of being immersed in the cooling liquid reserved in the cooling liquid collection tanks, thereby being sufficiently and reliably cooled by the cooling liquid.

It is preferable that each of the cooling liquid collection tanks has a top opening so as to receive therein the lower part of the corresponding coil end.

It is also preferable that each of the cooling liquid collection tanks has its upper end positioned vertically downward of the rotor.

It is also preferable that each of the cooling liquid collection tanks has a drain hole formed in its bottom wall portion so as to drain the cooling liquid out of the cooling liquid collection tank.

Each of the cooling liquid collection tanks may preferably have at least one guide member provided at a circumferential end thereof to guide the cooling liquid dispersing in a circumferential direction of the stator core into the cooling liquid collection tank.

Otherwise, each of the cooling liquid collection tanks may preferably have at least one guide member provided at an axially outer end thereof to guide the cooling liquid dispersing outward in an axial direction of the stator core into the cooling liquid collection tank.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings.

DESCRIPTION OF EMBODIMENT

Figure 1:
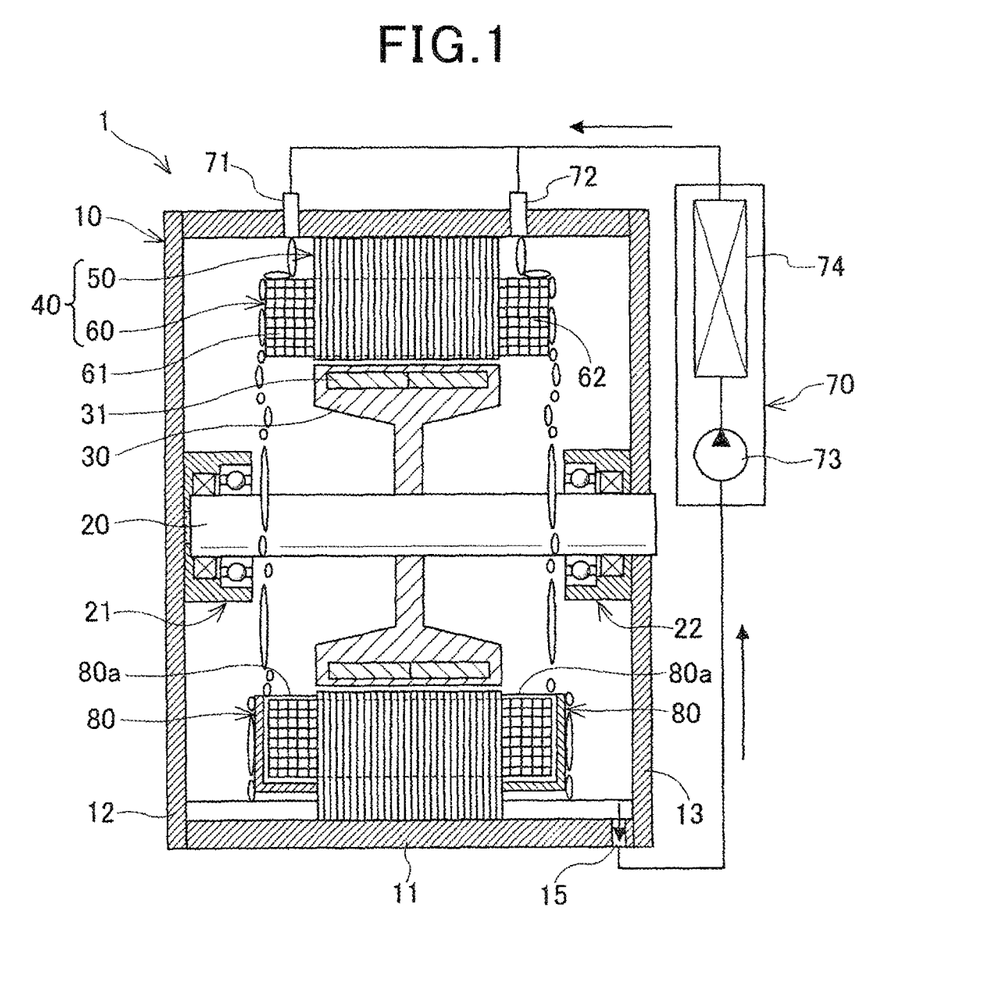
FIG. 1 is a schematic cross-sectional view of a rotating electric machine according to an embodiment, which is taken in a plane including the axis of a rotating shaft of the machine.
Figure 2:
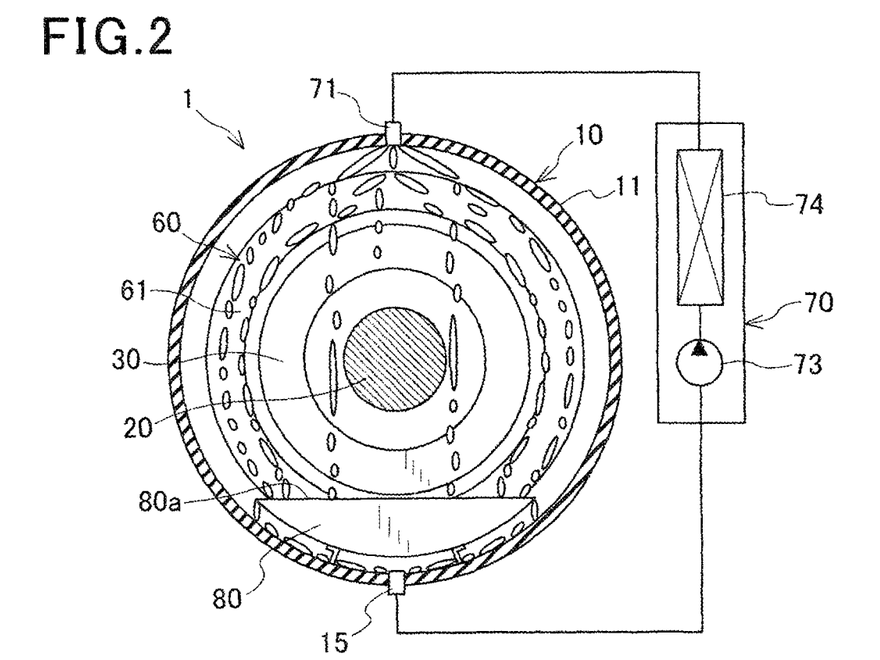
FIG. 2 is a schematic cross-sectional view of the rotating electric machine taken in a plane perpendicular to the axis of the rotating shaft.

FIGS. 1-2 show the overall configuration of a rotating electric machine 1 according to an embodiment.

In the present embodiment, the rotating electric machine 1 is configured as an electric motor for use in a motor vehicle.

As shown in the figures, the rotating electric machine 1 includes a housing 10, a rotating shaft 20, a rotor 30, a stator 40 that includes a stator core 50 and a stator coil 60, a cooling device 70 and a pair of cooling liquid collection tanks 80.

The housing 10 includes a hollow-cylindrical main body 11, which has an opposite pair of open ends, and a pair of lid portions 12 and 13 that are respectively fixed to the open ends of the main body 11 so as to seal the open ends. In a bottom wall portion of the main body 11, there is formed a drain outlet 15 for draining cooling liquid, which is supplied by the cooling device 70 to the stator coil 60, out of the housing 10. On central portions of inner surfaces of the lid portions 12 and 13, there are respectively provided a pair of bearings 21 and 22.

The rotating shaft 20 is rotatably supported by the housing 10 via the bearings 21 and 22.

The rotor 30 is substantially annular in shape and fixedly fitted on the outer periphery of an axially-central portion of the rotating shaft 20 so as to be coaxial with the rotating shaft 20. In a radially-outer peripheral portion of the rotor 30, there are embedded a plurality of permanent magnets 31 so as to be spaced from one another at predetermined intervals. The permanent magnets 31 together make up a plurality of magnetic poles, the polarities of which alternate between north and south in the circumferential direction of the rotor 30.

In addition, the number of the magnetic poles of the rotor 30 can be suitably set according to the design specification of the rotating electric machine 1. In the present embodiment, the number of the magnetic poles is set to be equal to, for example, eight (i.e., four north poles and four south poles).

The stator 40 includes the annular stator core 50, which is disposed radially outside the rotor 30 so as to surround the rotor 30, and the three-phase stator coil 60 mounted on the stator core 50.

In the present embodiment, the stator core 50 is comprised of, for example, 24 stator core segments that are arranged in the circumferential direction of the stator core 50 so as to adjoin one another in the circumferential direction. Each of the stator core segments is formed by laminating a plurality of arc-shaped magnetic steel sheets in the axial direction of the stator core 50.

In a radially-inner peripheral portion of the stator core 50, there are formed a plurality of slots (not shown) so as to be spaced from one another in the circumferential direction of the stator core 50 at predetermined intervals. For each of the slots, the depth direction of the slot coincides with a radial direction of the stator core 50. In the present embodiment, there are provided two slots per magnetic pole of the rotor 30 that has the eight magnetic poles and per phase of the three-phase stator coil 60. Accordingly, the total number of the slots provided in the stator core 50 is equal to 48 (i.e., 2×8×3).

The stator coil 60 is obtained by: (1) interlacing a plurality of wave-shaped electric wires (not shown) in a predetermined manner to form a planar band-shaped electric wire assembly; and (2) rolling the planar band-shaped electric wire assembly into a hollow cylindrical shape.

In the present embodiment, each of the electric wires forming the stator coil 60 is configured with an electric conductor having a rectangular cross section and an insulating coat that covers the outer surface of the electric conductor. Moreover, each of the electric wires is wave-shaped to include a plurality of in-slot portions (not shown) and a plurality of turn portions (not shown). Each of the in-slot portions is received in a corresponding one of the slots of the stator core 50. Each of the turn portions is located outside the slots of the stator core 50 and connects a corresponding adjacent pair of the in-slot portions.

In assembling the stator core 50 and the stator coil 60, tooth portions (not shown) of the stator core segments are respectively inserted into the spaces formed between stacks (not shown) of the in-slot portions of the electric wires from the radially outside of the stator coil 60; each of the stacks includes a predetermined number of the in-slot portions of the electric wires which are radially aligned with each other. Then, an outer cylinder (not shown) is fitted on the radially outer surfaces of the stator core segments so as to fasten them together to form the stator core 50. Consequently, the stator 40 is obtained where the stator coil 60 has a pair of annular coil ends 61 and 62 protruding axially outward respectively from opposite axial end faces of the stator core 50 (see FIG. 1). In addition, each of the coil ends 61 and 62 is made up of the turn portions of the electric wires located on the same axial side of the stator core 50.

The cooling device 70 includes a pair of nozzles 71 and 72, a pump 73 and a heat dissipator (or radiator) 74.

The nozzles 71 and 72 are respectively located vertically upward of the coil ends 61 and 62 of the stator coil 60 so as to discharge the cooling liquid to upper parts of the coil ends 61 and 62. More specifically, the nozzles 71 and 72 are mounted at predetermined positions in a top wall portion of the main body 11 of the housing 10 so as to have their discharge outlets respectively facing the uppermost points in the coil ends 61 and 62. The pump 73 is provided to deliver the cooling liquid to the nozzles 71 and 72. The heat dissipator 74 is configured to dissipate (or radiate) the heat of the cooling liquid which has been heated when passing through the housing 10.

Moreover, the nozzles 71 and 72, the pump 73 and the heat dissipator 74 are fluidically connected with one another via cooling liquid pipes to form a cooling liquid circulation circuit. More specifically, the cooling liquid discharged by the nozzles 71 and 72 to the upper parts of the coil ends 61 and 62 flows downward by gravity while cooling the coil ends 61 and 62. Then, the cooling liquid is drained out of the housing 10 via the drain outlet 15 formed in the bottom wall portion of the main body 11 of the housing 10. Thereafter, the cooling liquid is delivered by the pump 73 to the nozzles 71 and 72 through dissipation of the heat of the cooling liquid by the heat dissipator 74. Then, the cooling liquid is again discharged by the nozzles 71 and 72 to the upper parts of the coil ends 61 and 62.

In addition, in the present embodiment, ATF (Automotive Transmission Fluid) is used as the cooling liquid. However, it should be noted that other conventional cooling liquids, such as cooling oil, may also be used instead of ATF.

Figure 3:
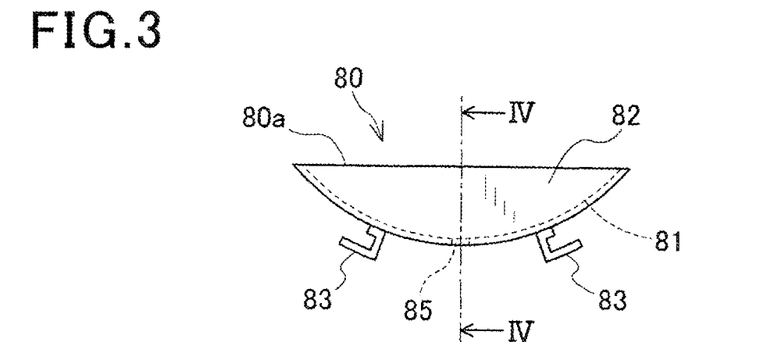
FIG. 3 is a front view of a cooling liquid collection tank of the rotating electric machine.
Figure 4:
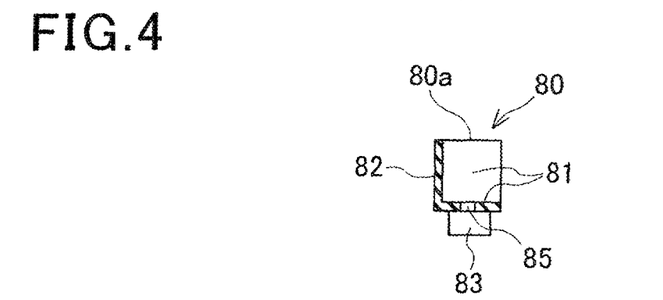
FIG. 4 is a cross-sectional view taken along the line IV-IV in FIG. 3.

Referring now to FIGS. 3-4, in the present embodiment, each of the cooling liquid collection tanks 80 is configured to include a bottom wall portion 81, a side wall portion 82 and a pair of brackets 83. The bottom wall portion 81 is curved to have an arc-shaped cross section conformed to the radially outer surface of a corresponding one of the coil ends 61 and 62. The side wall portion 82 has a substantially arcuate shape and is joined to one axial end face (or one end face in the width direction) of the bottom wall portion 81. The brackets 83 are fixed to the outer surface of the bottom wall portion 81 so as to together support the bottom wall portion 81. In addition, in a central portion of the bottom wall portion 81, there is formed a drain hole 85 so as to penetrate the bottom wall portion 81 in its thickness direction.

One of the cooling liquid collection tanks 80 has its brackets 83 fixed to the inner surface of the bottom wall portion of the main body 11 of the housing 10 so that the inner surface of the bottom wall portion 81 of the one cooling liquid collection tank 80 radially faces the radially outer surface of the lower part of the coil end 61, and the inner surface of the side wall portion 82 of the one cooling liquid collection tank 80 axially faces the axial end face of the coil end 61. Consequently, the one cooling liquid collection tank 80 surrounds the lower part of the coil end 61 such that the lower part of the coil end 61 is axially interposed between the inner surface of the side wall portion 82 of the one cooling liquid collection tank 80 and one of the axial end faces of the stator core 50. Moreover, the one cooling liquid collection tank 80 has a top opening 80a so as to receive the lower part of the coil end 61 therein. As a result, the one cooling liquid collection tank 80 can collect and temporarily reserve therein the cooling liquid which has been discharged by the nozzle 71 to the upper part of the coil end 61 and flowed by gravity from the upper part to the lower part of the coil end 61.

Similarly, the other cooling liquid collection tank 80 has its brackets 83 fixed to the inner surface of the bottom wall portion of the main body 11 of the housing 10 so that the inner surface of the bottom wall portion 81 of the other cooling liquid collection tank 80 radially faces the radially outer surface of the lower part of the coil end 62, and the inner surface of the side wall portion 83 of the other cooling liquid collection tank 80 axially faces the axial end face of the coil end 62. Consequently, the other cooling liquid collection tank 80 surrounds the lower part of the coil end 62 such that the lower part of the coil end 62 is axially interposed between the inner surface of the side wall portion 82 of the other cooling liquid collection tank 80 and the other axial end face of the stator core 50. Moreover, the other cooling liquid collection tank 80 has a top opening 80a so as to receive the lower part of the coil end 62 therein. As a result, the other cooling liquid collection tank 80 can collect and temporarily reserve therein the cooling liquid which has been discharged by the nozzle 72 to the upper part of the coil end 62 and flowed by gravity from the upper part to the lower part of the coil end 62.

In addition, an axial gap may be provided between each facing pair of the cooling liquid collection tanks 80 and the axial end faces of the stator core 50. Further, both the size of the axial gaps provided between the cooling liquid collection tanks 80 and the axial end faces of the stator core 50 and the size of the drain holes 85 formed in the bottom wall portions 81 of the cooling liquid collection tanks 80 may be suitably set so as to keep the cooling liquid reserved in the cooling liquid collection tanks 80 continuously overflowing via the top openings 80a of the cooling liquid collection tanks 80. Consequently, it is possible to keep the cooling liquid collection tanks 80 in a fully-filled state while continuously replacing the relatively high-temperature cooling liquid reserved in the cooling liquid collection tanks 80 with the relatively low-temperature cooling liquid just flowing or falling down to the lower parts from the upper parts of the coil ends 61 and 62.

In the present embodiment, each of the cooling liquid collection tanks 80 has its upper end positioned vertically downward of the rotor 30. Consequently, the rotor 30 is prevented from being immersed in the cooling liquid reserved in the cooling liquid collection tanks 80. As a result, it is possible to avoid a drag loss which otherwise would be generated by drag resistance of the cooling liquid to the rotor 30 during rotation of the rotor 30.

Next, operation of the rotating electric machine 1 according to the present embodiment will be described.

The rotating electric machine 1 is mounted at a predetermined position in the vehicle so that the axial direction of the rotating shaft 20 coincides with a horizontal direction, and the nozzles 71 and 72 of the cooling device 70 are positioned on the vertically upside of the coil ends 61 and 62 of the stator coil 60.

Upon supply of electric current to the stator coil 60, the rotor 30 rotates in a predetermined direction. Moreover, with the rotation of the rotor 30, the rotating shaft 20 also rotates in the predetermined direction, driving other devices or components mechanically connected to the rotating shaft 20.

At the same time, the pump 73 and the heat dissipator 74 of the cooling device 70 starts their operation, delivering the cooling liquid to the nozzles 71 and 72. Then, the cooling liquid is discharged from the discharge outlets of the nozzles 71 and 72 to the upper parts of the coil ends 61 and 62 of the stator coil 60.

Further, referring to FIGS. 1-2, part of the cooling liquid discharged to the upper parts of the coil ends 61 and 62 flows along the surfaces of the turn portions of the electric wires to the lower parts of the coil ends 61 and 62 while cooling the turn portions of the electric wires; as described previously, the turn portions of the electric wires together make up the coil ends 61 and 62. On the other hand, the remaining cooling liquid falls down directly to the lower parts of the coil ends 61 and 62.

All the cooling liquid arriving at the lower parts of the coil ends 61 and 62 is then collected and temporarily reserved in the cooling liquid collection tanks 80. Consequently, the lower parts of the coil ends 61 and 62 are brought into a state of being immersed in the cooling liquid reserved in the cooling liquid collection tanks 80, thereby being reliably cooled by the cooling liquid.

Moreover, the cooling liquid reserved in the cooling liquid collection tanks 80 leaves the tanks 80 either by overflowing via the top openings 80a of the tanks 80 or by draining out via the drain holes 85 of the tanks 80. Consequently, the cooling liquid reserved in the cooling liquid collection tanks 80 is continuously replaced with the cooling liquid just arriving at the lower parts of the coil ends 61 and 62. The temperature of the cooling liquid reserved in the cooling liquid collection tanks 80 has been increased by heat transmitted from the lower parts of the coil ends 61 and 62 to the cooling liquid; therefore, the temperature of the cooling liquid reserved in the cooling liquid collection tanks 80 is higher than that of the cooling liquid just arriving at the lower parts of the coil ends 61 and 62. Accordingly, with the above configuration, it is possible to more effectively and reliably cool the lower parts of the coil ends 61 and 62.

The above-described rotating electric machine 1 according to the present embodiment has the following advantageous effects.

In the present embodiment, the rotating electric machine 1 includes the rotor 30, the stator 40, the cooling device 70 and the pair of cooling liquid collection tanks 80. The stator 40 includes the annular stator core 50 and the stator coil 60. The stator core 50 is disposed radially outside the rotor 30 so as to surround the rotor 30. The stator coil 60 is mounted on the stator core 50 so that the pair of coil ends 61 and 62 of the stator coil 60 protrude axially outward respectively from opposite axial end faces of the stator core 50. The cooling device 70 is configured to supply the cooling liquid to the vertically upper parts of the coil ends 61 and 62 of the stator coil 60. Each of the cooling liquid collection tanks 80 is arranged to surround the vertically lower part of the corresponding coil end 61 or 62 so as to collect and temporarily reserve therein the cooling liquid which is moved by gravity from the upper part to the lower part of the corresponding coil end 61 or 62.

With the above configuration, the lower parts of the coil ends 61 and 62 of the stator coil 60 can be kept in the state of being immersed in the cooling liquid reserved in the cooling liquid collection tanks 80, thereby being sufficiently and reliably cooled by the cooling liquid.

Moreover, in the present embodiment, each of the cooling liquid collection tanks 80 has the top opening 80a so as to receive therein the lower part of the corresponding coil end 61 or 62.

Consequently, with the top openings 80a, it is possible to reliably collect the cooling liquid, which flows or falls down from the upper parts to the lower parts of the coil ends 61 and 62, in the cooling liquid collection tanks 80. Moreover, it is also possible to allow the cooling liquid reserved in the cooling liquid collection tanks 80 to continuously overflow, thereby continuously replacing the relatively high-temperature cooling liquid reserved in the cooling liquid collection tanks 80 with the relatively low-temperature cooling liquid just arriving at the lower parts of the coil ends 61 and 62. As a result, it is possible to more effectively and reliably cool the lower parts of the coil ends 61 and 62 with the cooling liquid reserved in the cooling liquid collection tanks 80.

In the present embodiment, each of the cooling liquid collection tanks 80 has its upper end positioned vertically downward of the rotor 30.

With the above arrangement, it is possible to prevent the rotor 30 from being immersed in the cooling liquid reserved in the cooling liquid collection tanks 80. As a result, it is possible to avoid a drag loss which otherwise would be generated by drag resistance of the cooling liquid to the rotor 30 during rotation of the rotor 30.

In the present embodiment, each of the cooling liquid collection tanks 80 has the drain hole 85 formed in the bottom wall portion 81 thereof.

Consequently, with the drain holes 85, it is possible to allow the cooling liquid reserved in the cooling liquid collection tanks 80 to continuously drain out, thereby continuously replacing the relatively high-temperature cooling liquid reserved in the cooling liquid collection tanks 80 with the relatively low-temperature cooling liquid just arriving at the lower parts of the coil ends 61 and 62. As a result, it is possible to more effectively and reliably cool the lower parts of the coil ends 61 and 62 with the cooling liquid reserved in the cooling liquid collection tanks 80.

[First Modification]

Figure 5:
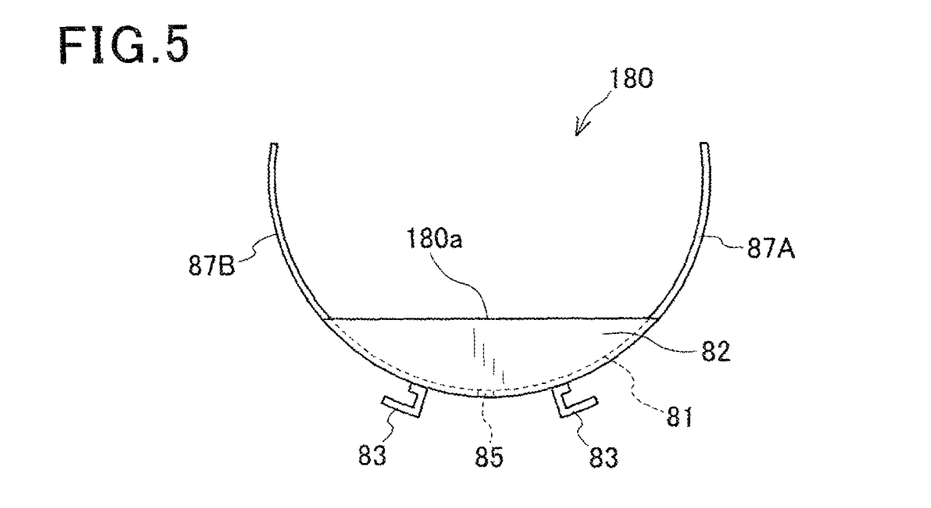
FIG. 5 is a front view of a cooling liquid collection tank according to a first modification.
Figure 6:
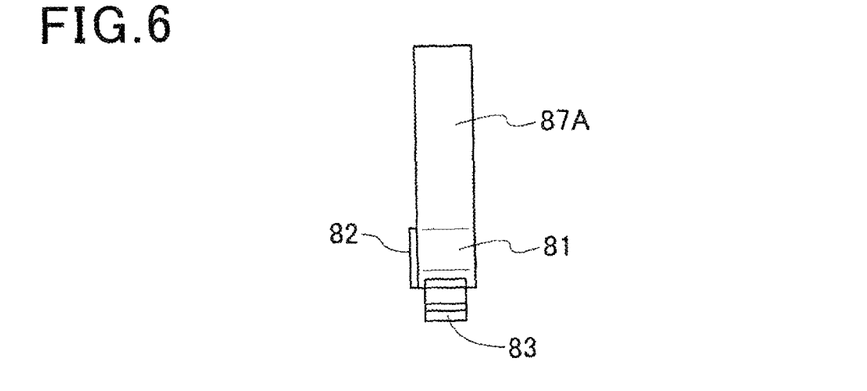
FIG. 6 is a side view of the cooling liquid collection tank according to the first modification.

FIGS. 5-6 show the configuration of cooling liquid collection tanks 180 according to a first modification.

As shown in the figures, in this modification, each of the cooling liquid collection tanks 180 further includes a pair of guide members 87A and 87B in comparison with the cooling liquid collection tanks 80 according to the previous embodiment.

Specifically, the guide members 87A and 87B are respectively provided at opposite circumferential ends of the bottom wall portion 81. Each of the guide members 87A and 87B is curved to have an arc-shaped cross section conformed to the radially outer surface of the corresponding coil end 61 or 62. Moreover, both the guide members 87A and 87B are integrally formed with the bottom wall portion 81 so as to circumferentially extend respectively from opposite circumferential ends of the bottom wall portion 81 at the same curvature as the bottom wall portion 81. In addition, the guide members 87A and 87B are symmetrically formed with respect to the bottom wall portion 81.

In operation of the rotating electric machine 1, the cooling liquid may disperse in the radially outward and circumferential directions of the rotating shaft 20 (or the stator core 50) due to centrifugal force and wind both of which are generated with rotation of the rotor 30. However, with the guide members 87A and 87B, it is possible to guide the dispersing cooling liquid to the top openings 180a of the cooling liquid collection tanks 180. Consequently, it is possible to more effectively collect the cooling liquid in the cooling liquid collection tanks 180, thereby more sufficiently and reliably cooling the lower parts of the coil ends 61 and 62 of the stator coil 60.

In addition, the cooling liquid collection tanks 180 according to the present modification is particularly suitable for use in the case where the rotating electric machine 1 is configured as a motor-generator and thus the rotor 30 rotates selectively in opposite directions.

[Second Modification]

Figure 7:
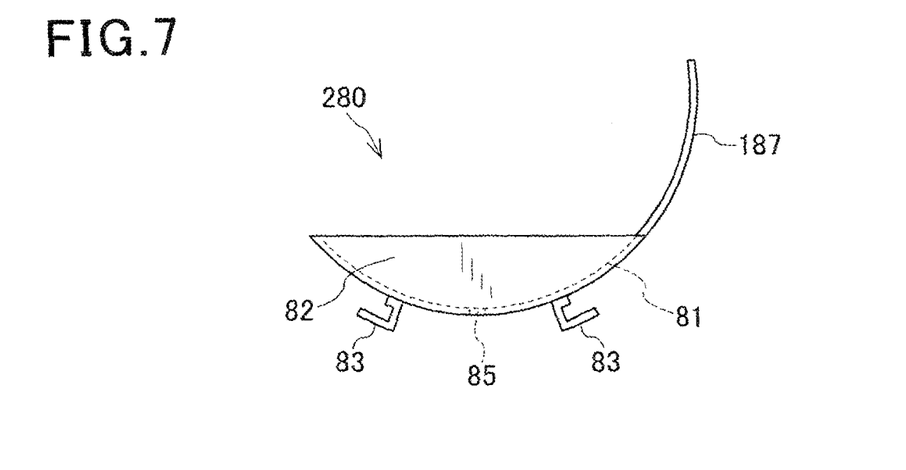
FIG. 7 is a front view of a cooling liquid collection tank according to a second modification.
Figure 8:
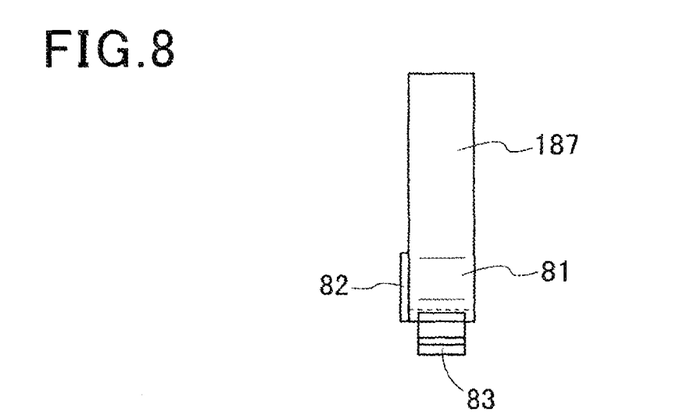
FIG. 8 is a side view of the cooling liquid collection tank according to the second modification.

FIGS. 7-8 show the configuration of cooling liquid collection tanks 280 according to a second modification.

As shown in the figures, in this modification, each of the cooling liquid collection tanks 280 has only one guide member 187 provided at one circumferential end of the bottom wall portion 81 of the cooling liquid collection tank 280.

The guide member 187 has the same configuration and performs the same function as the guide members 87A and 87B in the first modification. Accordingly, description of the guide member 187 is omitted hereinafter.

The cooling liquid collection tanks 280 according to the present modification is suitable for use in the case where the rotating electric machine 1 is configured as a unidirectional electric motor or generator and thus the rotor 30 rotates only in one direction.

[Third Modification]

Figure 9:
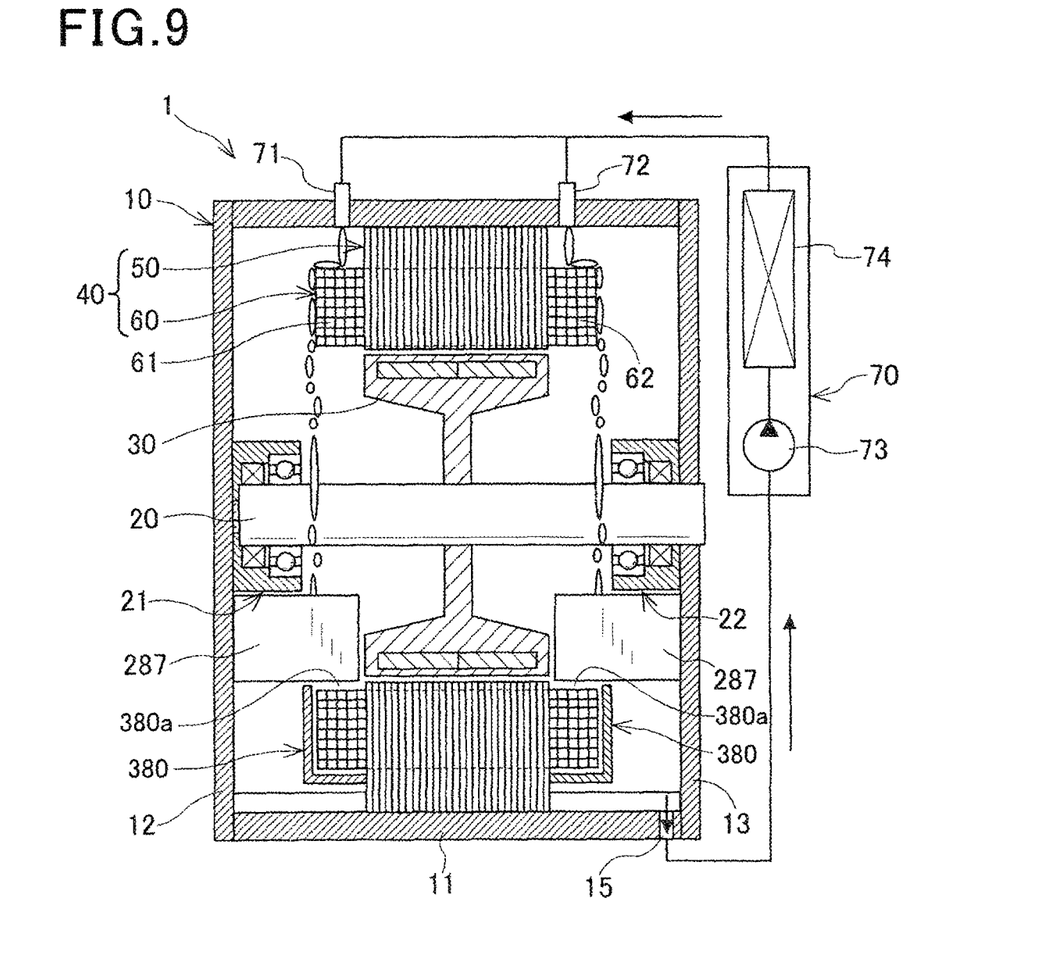
FIG. 9 is a schematic cross-sectional view of the rotating electric machine taken in a plane including the axis of the rotating shaft, wherein the machine includes a pair of cooling liquid collection tanks according to a third modification.

FIG. 9 shows the configuration of cooling liquid collection tanks 380 according to a third modification.

In this modification, each of the cooling liquid collection tanks 380 has only one guide member 287 provided at one circumferential end of the bottom wall portion 81 of the cooling liquid collection tank 380, as in the second modification.

However, as shown in FIG. 9, the guide member 287 is formed separately from the bottom wall portion 81, unlike the guide member 187 according to the second modification.

Further, the guide member 287 has almost the same circumferential length as the guide member 187 according to the second modification. However, the axial width of the guide member 287 is about three times that of the guide member 187 according to the second modification.

Moreover, in this modification, the guide member 287 has one axial end fixed to the inner surface of a corresponding one of the lid portions 12 and 13 of the housing 10. Further, the guide member 287 is axially interposed between the corresponding lid portion 12 or 13 of the housing 10 and a corresponding one of axial end faces of the rotor 30 so as not to interfere with the rotor 30. Furthermore, the lower end of the guide member 287 is located inside the top opening 380a of the cooling liquid collection tank 380. Consequently, with the guide member 287, it is possible to reliably guide the dispersing cooling liquid into the cooling liquid collection tank 380.

In the present modification, the separate formation of the guide members 287 from the bottom wall portions 81 of the cooling liquid collection tanks 380 facilitates the manufacture of the cooling liquid collection tanks 380. Moreover, with the remarkably-increased axial width of the guide members 287, it is possible for the cooling liquid collection tanks 380 to reliably collect the dispersing cooling liquid over a wide axial range.

In addition, it should be noted that each of the cooling liquid collection tanks 380 may have a pair of guide members 287 respectively provided at opposite circumferential ends of the bottom wall portion 81 of the cooling liquid collection tank 380.

[Fourth Modification]

Figure 10:
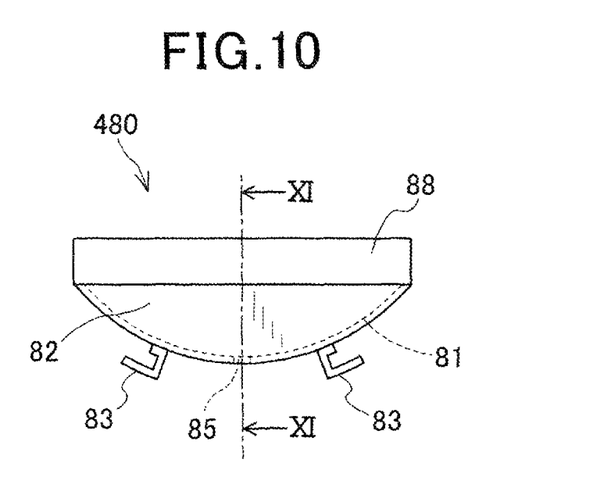
FIG. 10 is a front view of a cooling liquid collection tank according to a fourth modification.
Figure 11:
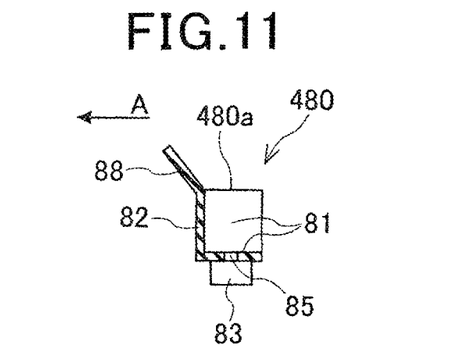
FIG. 11 is a cross-sectional view taken along the line XI-XI in FIG. 10.

FIGS. 10-11 show the configuration of cooling liquid collection tanks 480 according to a fourth modification.

As shown in the figures, in this modification, each of the cooling liquid collection tanks 480 further includes a guide member 88 in comparison with the cooling liquid collection tanks 80 according to the previous embodiment.

Specifically, the guide member 88 has the shape of a rectangular plate and is formed integral with the side wall portion 82 of the cooling liquid collection tank 480 with one of the longer sides of the guide member 88 connected with the upper end (i.e., the chord of the arcuate shape) of the side wall portion 82. Further, the guide member 88 protrudes axially outward (i.e., in the direction A in FIG. 11) from the side wall portion 82 so as to be oblique to the side wall portion 82.

In the present modification, with the guide members 88, it is possible to guide the cooling liquid dispersing axially outward (i.e., outward in the axial direction of the rotating shaft 20 or the stator core 50) to the top openings 480a of the cooling liquid collection tanks 480. Consequently, it is possible to more effectively collect the cooling liquid in the cooling liquid collection tanks 480, thereby more sufficiently and reliably cooling the lower parts of the coil ends 61 and 62 of the stator coil 60.

[Fifth Modification]

Figure 12:
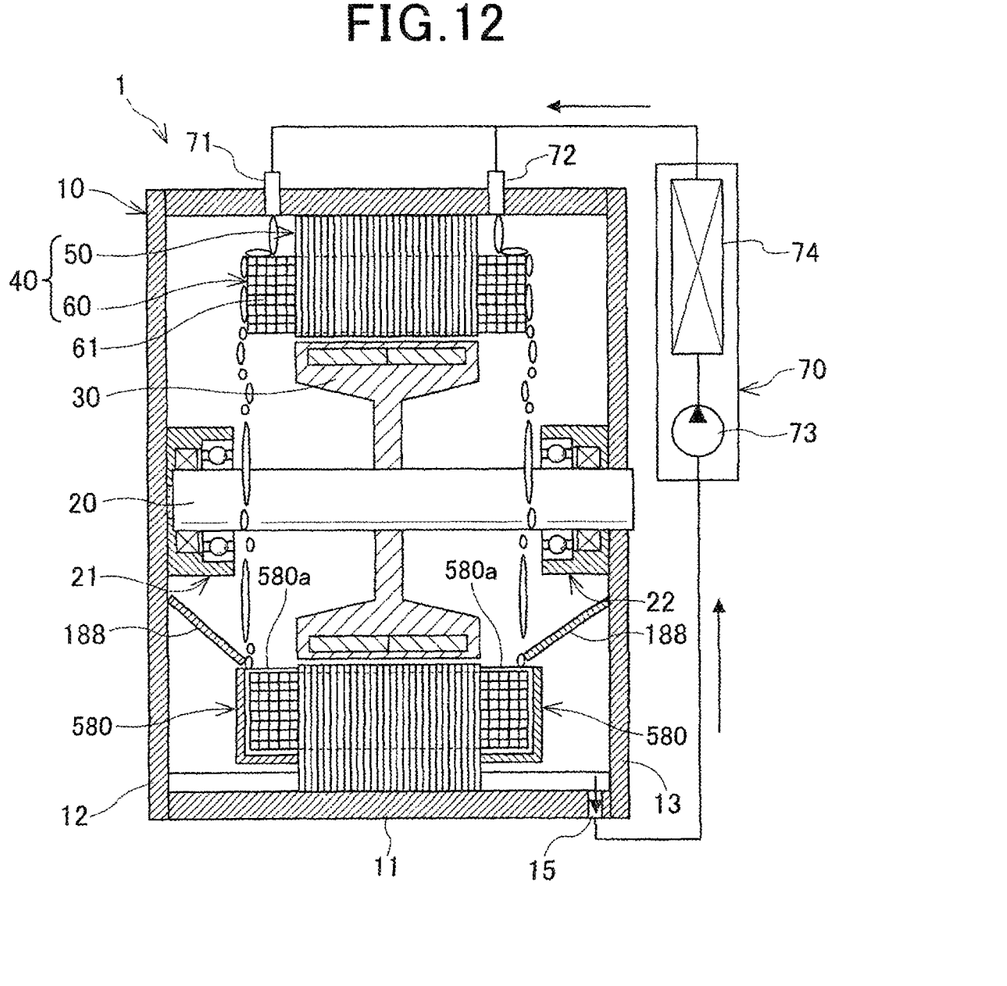
FIG. 12 is a schematic cross-sectional view of the rotating electric machine taken in a plane including the axis of the rotating shaft, wherein the machine includes a pair of cooling liquid collection tanks according to a fifth modification.

FIG. 12 shows the configuration of cooling liquid collection tanks 580 according to a fifth modification.

In this modification, each of the cooling liquid collection tanks 580 has a guide member 188 provided at the upper end of the side wall portion 82 of the cooling liquid collection tank 580, as in the fourth modification.

However, as shown in FIG. 12, the guide member 188 is formed separately from the side wall portion 82, unlike the guide member 88 according to the fourth modification.

Further, the guide member 188 has almost the same length in the direction of the chord of the arcuate side wall portion 82 (i.e., in the direction perpendicular to the paper surface of FIG. 12) as the guide member 88 according to the fourth modification. However, the width of the guide member 188 in the direction perpendicular to the chord of the arcuate side wall portion 82 is about three times that of the guide member 88 according to the fourth modification.

Moreover, in this modification, the guide member 188 has its upper end fixed to the inner surface of a corresponding one of the lid portions 12 and 13 of the housing 10. Further, the lower end of the guide member 188 is located inside the top opening 580a of the cooling liquid collection tank 580. Consequently, with the guide member 188, it is possible to reliably guide the cooling liquid dispersing axially outward into the cooling liquid collection tank 580.

In the present modification, the separate formation of the guide members 188 from the side wall portions 82 of the cooling liquid collection tanks 580 facilitates the manufacture of the cooling liquid collection tanks 580. Moreover, with the remarkably-increased width of the guide members 188, it is possible for the cooling liquid collection tanks 580 to reliably collect the dispersing cooling liquid over a wide axial range. Consequently, it is possible to more sufficiently and reliably cool the lower parts of the coil ends 61 and 62 of the stator coil 60.

While the above particular embodiment and its modifications have been shown and described, it will be understood by those skilled in the art that various further modifications, changes, and improvements may be made without departing from the spirit of the present invention.

For example, in the previous embodiment, the cooling device 70 is configured to include the pair of nozzles 71 and 72, the pump 73 and the heat dissipator 74, all of which are fluidically connected with one another via the cooling liquid pipes to form the cooling liquid circulation circuit.

However, the cooling device 70 may alternatively have other configurations provided such that it can supply the cooling liquid to the upper parts of the coil ends 61 and 62 of the stator coil 60.

In the previous embodiment, the stator coil 60 is obtained by first interlacing the wave-shaped electric wires in the predetermined manner to form the planar band-shaped electric wire assembly and then rolling the planar band-shaped electric wire assembly into the hollow cylindrical shape.

However, the stator coil 60 may also be alternatively obtained by: (1) inserting, from one axial side of the stator core 50, a plurality of substantially U-shaped electric conductor segments into corresponding slots of the stator core 50; and (2) joining, on the other axial side of the stator core 50, corresponding pairs of end portions of the electric conductor segments. In this case, the coil end of the stator coil on the other axial side of the stator core 50 includes the joints formed between the end portions of the electric conductor segments. Compared to the coil end of the stator coil on the one axial side of the stator core 50, the coil end on the other axial side of the stator core 50 has more gaps or void spaces formed between the end portions of the electric conductor segments. Consequently, it is easier for the cooling liquid to directly fall down through the gaps or void spaces without cooling the end portions of the electric conductor segments. However, even in this case, it is still possible to reliably cool the lower parts of the coil ends of the stator coil using the cooling liquid collection tanks described in the previous embodiment and modifications.

In the previous embodiment, each of the electric wires forming the stator coil 60 includes the electric conductor having the rectangular cross section and the insulating coat that covers the outer surface of the electric conductor.

However, each of the electric wires may include an electric conductor having a circular cross section instead of the electric conductor having the rectangular cross section.

What is claimed is:

1. A rotating electric machine comprising:
    a rotor;
    a stator including an annular stator core and a stator coil, the stator core being disposed radially outside the rotor so as to surround the rotor, the stator coil being mounted on the stator core so that a pair of coil ends of the stator coil protrude axially outward respectively from opposite axial end faces of the stator core;
    a cooling device configured to supply cooling liquid to vertically upper parts of the coil ends of the stator coil; and
    a pair of cooling liquid collection tanks each of which is arranged to surround only a vertically lower part of a corresponding one of the coil ends of the stator coil, without covering a radially inner periphery of the lower part of the corresponding coil end, so as to collect and temporarily reserve therein the cooling liquid moved from the upper part to the lower part of the corresponding coil end, wherein
    each of the cooling liquid collection tanks has a top opening so as to receive therein the lower part of the corresponding coil end.

2. The rotating electric machine as set forth in claim 1, wherein each of the cooling liquid collection tanks has its upper end positioned vertically downward of the rotor.

3. The rotating electric machine as set forth in claim 1, wherein each of the cooling liquid collection tanks has a drain hole formed in its bottom wall portion so as to drain the cooling liquid out of the cooling liquid collection tank.

4. The rotating electric machine as set forth in claim 1, wherein each of the cooling liquid collection tanks has at least one guide member provided at a circumferential end thereof to guide the cooling liquid dispersing in a circumferential direction of the stator core into the cooling liquid collection tank.

5. The rotating electric machine as set forth in claim 1, wherein each of the cooling liquid collection tanks has at least one guide member provided at an axially outer end thereof to guide the cooling liquid dispersing outward in an axial direction of the stator core into the cooling liquid collection tank.

* * * * *